US006886747B2

(12) United States Patent
Snapp

(10) Patent No.: US 6,886,747 B2
(45) Date of Patent: May 3, 2005

(54) SYSTEM AND METHOD FOR STANDARDIZING A MAILING ADDRESS

(75) Inventor: Robert F Snapp, Memphis, TN (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 10/297,986

(22) PCT Filed: Mar. 22, 2002

(86) PCT No.: PCT/US02/08650

§ 371 (c)(1),
(2), (4) Date: Dec. 12, 2002

(87) PCT Pub. No.: WO02/077874

PCT Pub. Date: Oct. 3, 2002

(65) Prior Publication Data

US 2004/0007616 A1 Jan. 15, 2004

Related U.S. Application Data

(60) Provisional application No. 60/277,622, filed on Mar. 22, 2001.

(51) Int. Cl.[7] .............................................. G06F 17/60
(52) U.S. Cl. ...................... 235/385; 235/375; 235/494
(58) Field of Search ................................ 235/375, 385, 235/494; 707/101; 705/1

(56) References Cited

U.S. PATENT DOCUMENTS

| | | | |
|---|---|---|---|
| 4,743,747 A | * | 5/1988 | Fougere et al. ............. 235/494 |
| 4,871,903 A | | 10/1989 | Carrell |
| 5,005,124 A | | 4/1991 | Connell et al. |
| 5,009,321 A | | 4/1991 | Keough |
| 5,042,667 A | | 8/1991 | Keough |
| 5,249,687 A | | 10/1993 | Rosenbaum et al. |
| 5,291,002 A | * | 3/1994 | Agnew et al. ............. 235/375 |
| 5,311,597 A | | 5/1994 | Rosenbaum |
| 5,329,102 A | * | 7/1994 | Sansone ..................... 235/375 |
| 5,363,971 A | | 11/1994 | Weeks et al. |
| 5,420,403 A | * | 5/1995 | Allum et al. ............... 235/375 |
| 5,514,863 A | * | 5/1996 | Williams .................... 235/494 |
| 5,667,078 A | | 9/1997 | Walach |
| 2004/0030661 A1 | | 2/2004 | Amato |

FOREIGN PATENT DOCUMENTS

| | | |
|---|---|---|
| EP | 1 086 754 | 3/2001 |
| WO | WO 99/07487 | 2/1999 |

OTHER PUBLICATIONS

International Preliminary Examination Report in PCT Application No. PCT/US02/08650, mailed Dec. 5, 2002.
International Search Report in PCT Application No. PCT/US02/08650, mailed Jul. 12, 2002.
International Search Report of Application No. PCT/US01/47717, mailed Jan. 16, 2004.

* cited by examiner

*Primary Examiner*—Michael G. Lee
*Assistant Examiner*—Seung H Lee
(74) *Attorney, Agent, or Firm*—Finnegan, Henderson, Farabow, Garrett & Dunner, LLP

(57) ABSTRACT

To standardize a mailing address, a zip code is extracted from the mailing address (FIG. 1A). A primary number (102) from a primary field of the mailing address (110) and a secondary number (112) from a secondary field (120) of the mailing address are also extracted. The zip code, the primary number, and the secondary number are concatenated.

40 Claims, 5 Drawing Sheets

1234 Main Street Apt 3  /210
Anytown, USA 38188-1013

1234-3 Main Street  /220
Anytown, USA 38188-1013

1234 Main Street # 3  /230
Anytown, USA 38188-1013

SYSTEM AND METHOD FOR STANDARDIZING A MAILING ADDRESS

CROSS-REFERENCE TO RELATED APPLICATION

This application is a 371 of PCT/US02/08650 filed Mar. 22, 2002 which claims the priority benefit of U.S. Provisional Application No. 60/277,622, filed on Mar. 22, 2001, which is incorporated herein by reference.

FIELD

The invention relates generally to systems and methods for standardizing a mailing address.

BACKGROUND

A mailing address may be represented in many different ways. For example, the mailing address 123 Main Street, Apt. A may also be represented as 123-A Main Street. A computerized list of mailing addresses may contain multiple representations of the same mailing address. To update a mailing address on the mailing list, it is necessary to find all instances of the mailing address on the mailing list. However, all instances of the mailing address may not be updated because the various representations of the mailing address may not all be found. Further, having multiple instances of the same mailing address on a computerized mailing list increases storage requirements, which may be costly. Accordingly, there is a need for systems and methods for creating one standard representation for a mailing address.

SUMMARY

In accordance with the invention, this is provided a method for standardizing a mailing address. Further, in accordance with the invention, there is provided a computer readable medium containing instructions for controlling a computer system to perform the method. The method comprises extracting a postal code from the mailing address, extracting a primary number from a primary field of the mailing address, and extracting a secondary number from a secondary field of the mailing address. The method further comprises concatenating the postal code, the primary number, and the secondary number.

Additional advantages of the invention will be set forth in part in the description which follows, and in part will be obvious from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

In the drawings:

FIG. 2 illustrates a mailing address having three different representations and one standard representation.

DESCRIPTION OF THE EMBODIMENTS

Figure 1A:
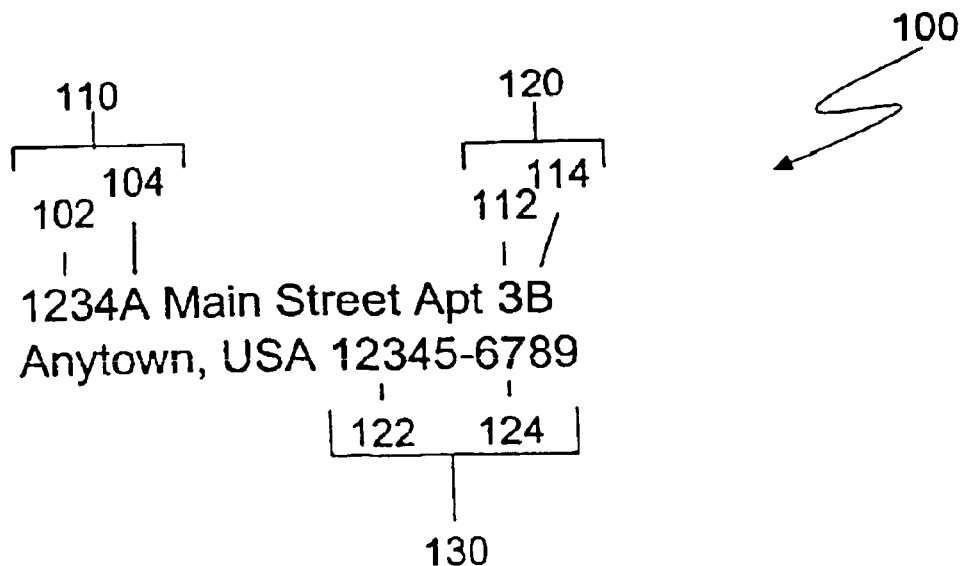
FIG. 1A illustrates components that may be present in a mailing address.
Figure 1B:
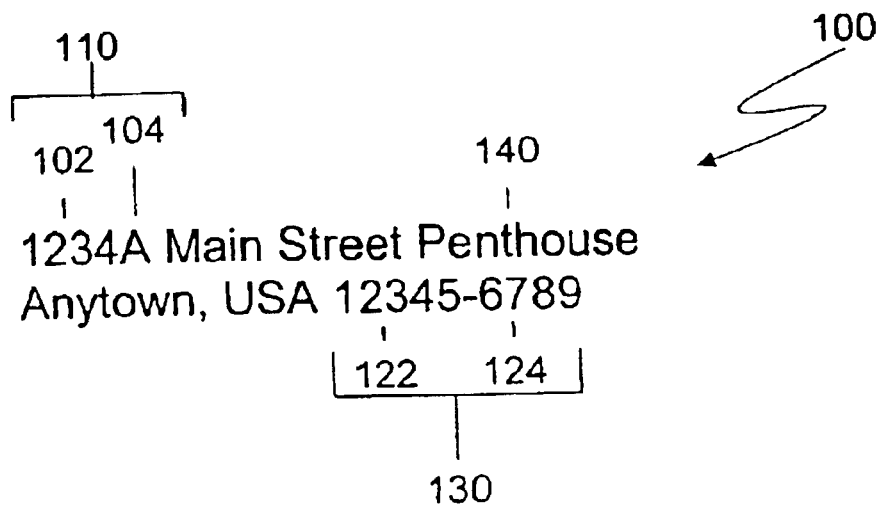
FIG. 1B illustrates additional components that may be present in a mailing address.

Referring now to the drawings, FIG. 1A illustrates components that may be present in a mailing address 100. These components include a primary field 110 having a primary number 102 and at least one non-numeric character 104; a secondary field 120 having a secondary number 112 and at least one non-numeric character 114; and a postal code field 130 having an initial postal code 122 and an expanded postal code 124. As shown in FIG. 1B, a mailing address 100 may include a secondary descriptor 140 in lieu of a secondary field 120. Examples of secondary descriptors include: Basement, Front, Lobby, Lower, Rear, Side, Upper, Penthouse. Secondary descriptors may not be followed by numeric or non-numeric characters. Postal codes may consist of alphanumeric characters, all alpha characters, or all numeric characters, such as a ZIP Code™. The initial postal code 122 may correspond to a five digit ZIP Code™ established by the United States Postal Service. The expanded postal code 124 may correspond to a four digit expanded code that is part of a ZIP+4™ code established by the United States Postal Service.

A mailing address in a mailing list may not include one or more of the above described components. For example, a mailing address in a mailing list may not include an expanded code 124. As another example, a mailing address in a mailing list may not include at least one non-numeric character 104 in primary field 110.

FIG. 2 illustrates a mailing address having three different representations 210, 220, and 230. Using systems and methods consistent with the present invention, a standard mailing address 240 representing mailing addresses 210, 220, and 230 may be created.

Figure 3:
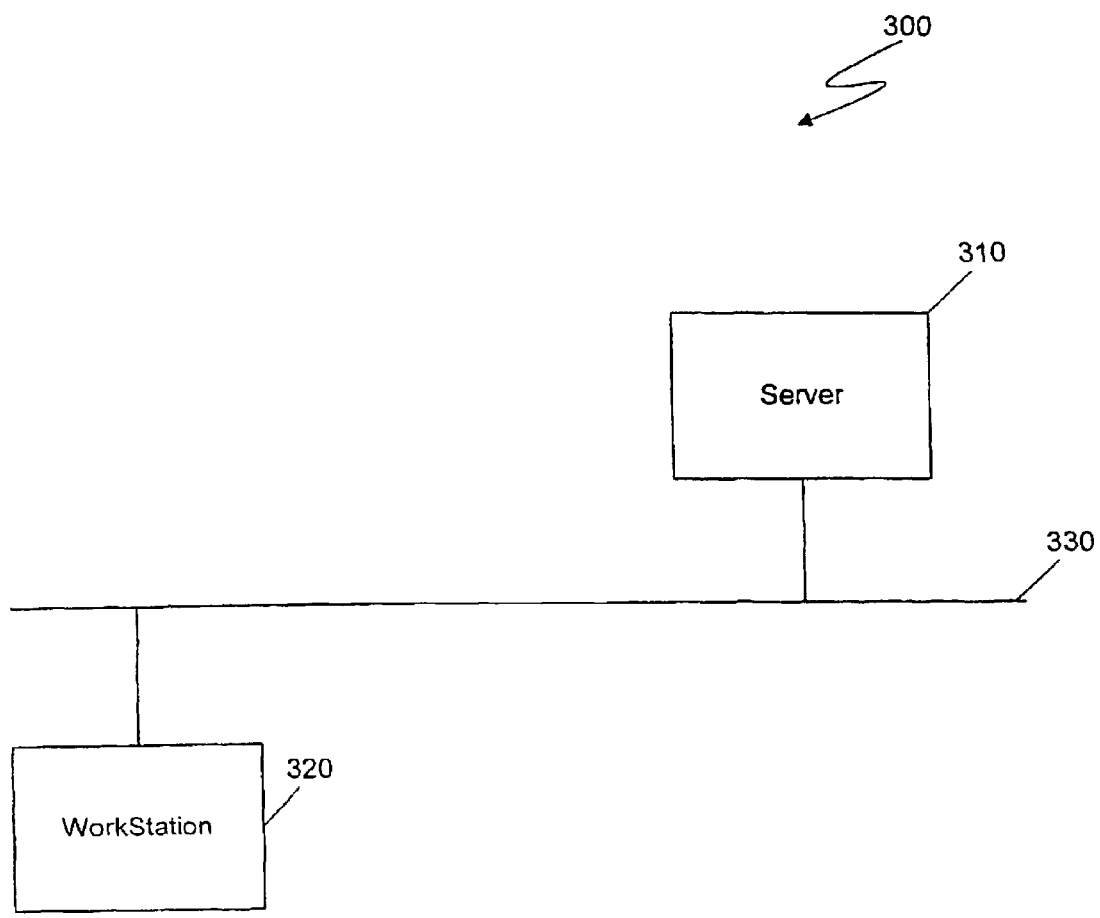
FIG. 3 illustrates an exemplary system in which to practice the present invention.

FIG. 3 illustrates an exemplary system 300 in which to practice the present invention. System 300 consists of a server 310, a workstation 320, and a connection 330. Server 310 includes a processor (not shown) comprising computer instructions for implementing methods consistent with the present invention. Workstation 320 may be a personal computer having a keyboard for inputting a mailing address and a storage medium for storing a mailing address or a mailing list. Connection 330 may comprise a local area network (LAN) connection, a wide area network (WAN) connection, an Internet connection, or a combination of the foregoing. Connection 330 may comprise a telephone line, optical fiber, coaxial cable, twisted wire pair, or a combination of the foregoing. Connection 330 may be wireless using any appropriate technique to provide wireless transmission including infrared line of sight, cellular, microwave, satellite, packet radio, spread spectrum, or a combination of the foregoing.

A mailing list may be standardized by transmitting the mailing list to the server via communication link 330 wherein each address on the mailing list undergoes a standardization method consistent with the present invention. In an alternate embodiment, a stand-alone workstation may include a processor (not shown) comprising computer instructions for implementing methods consistent with the present invention.

Figure 4:
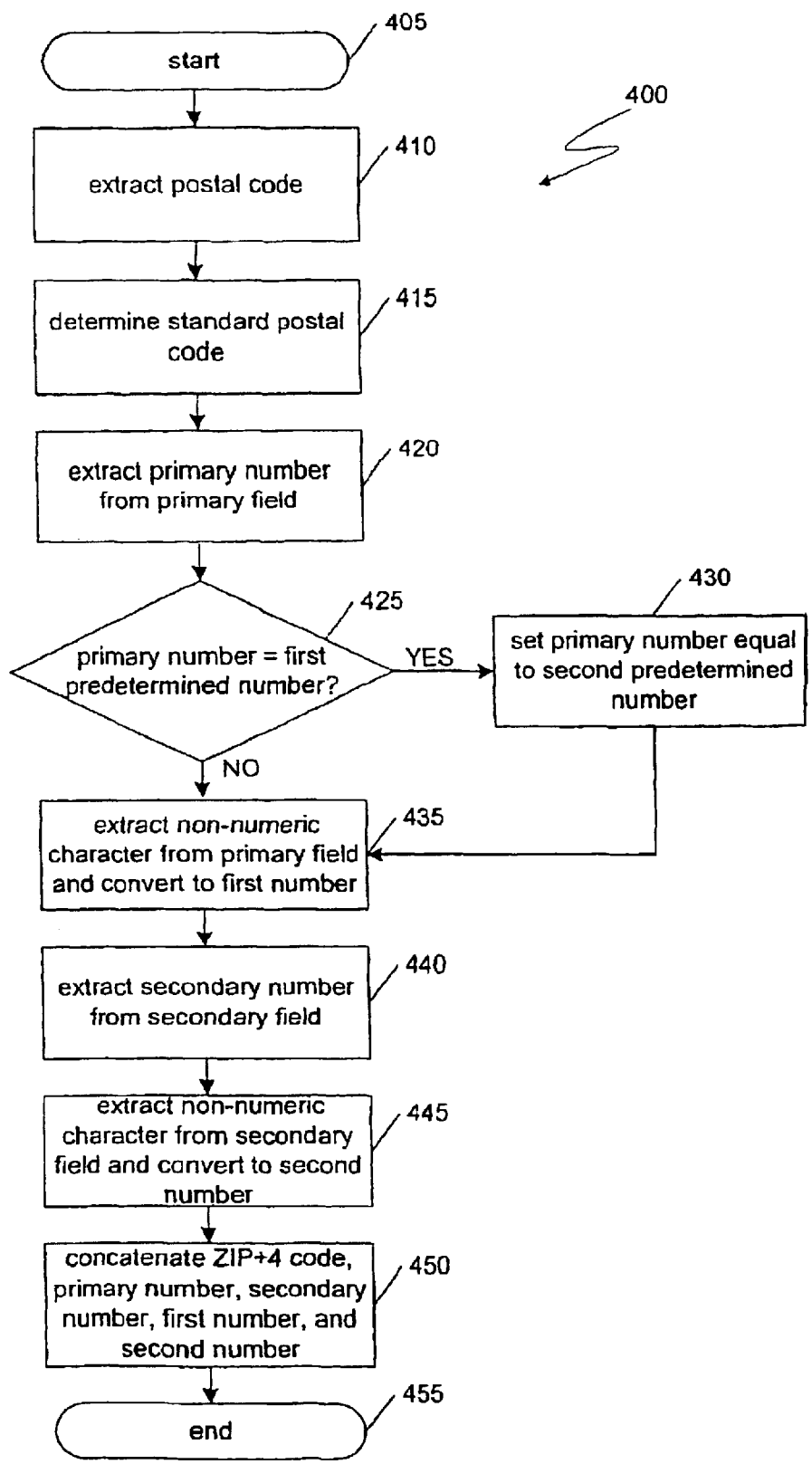
FIG. 4 illustrates a method for standardizing a mailing address consistent with the present invention.

FIG. 4 illustrates a method 400 for standardizing a mailing address consistent with an embodiment of the present invention. At step 410, a postal code is extracted from the mailing address. Systems and methods for extracting a postal code from a mailing address are well known to those of ordinary skill in the art. The postal code includes information provided in the postal code field of the mailing address. The postal code extracted may only include an initial postal code 122, such as a ZIP Code™, or the postal code extracted may include an initial postal code 122 and an expanded postal code 124, such as a ZIP+4™ code.

At step 415, the postal code extracted at step 410 is used to determine a standard postal code for the mailing address, such as a ZIP+4™ code. The ZIP+4™ code is a nine digit numeric code composed of a five digit initial code and a four digit expanded code. Using the postal code extracted at step 410, the standard postal code may be determined by searching a table comprising a list of standard postal codes. In one embodiment, the table may be a LCD (Lowest Common Denominator) table provided by the United States Postal Service, which provides a list of ZIP+4™ codes. If the postal code extracted at step 410 consists of only an initial postal code 122 (such as a ZIP Code™), then a search of the table may provide a corresponding expanded postal code 124 (such as the four digit expanded code in a ZIP+4™ code), which together with the initial postal code 122 determines a standard postal code (such as a ZIP+4™ code). If the postal code extracted at step 410 consists of an initial postal code 122 and an expanded postage code 124, the table may be searched to determine whether expanded postal code 124 is accurate.

At step 420, the primary number 102 from primary field 110 is extracted from the mailing address. Systems and methods for extracting the primary number 102 from a mailing address are well known to those of ordinary skill in the art.

At step 425, it is determined whether primary number 102 equals a first predetermined number. In one embodiment, primary number 102 may be compared with numbers contained in Table 1 below. If primary number 102 matches one of the numbers of Table 1 (i.e., "YES" at step 415), then primary number 102 may be set equal to a corresponding number in Table 2, for example, at step 430. Each of the numbers is Table 1 may be any number that increases the likelihood that different mailing addresses will have the same standardized mailing address. Each of the numbers in Table 2 may be any number that reduces the likelihood that different mailing addresses will have the same standardized mailing address.

TABLE 1

| |
|---|
| 1111 |
| 2222 |
| 3333 |
| 4444 |
| 5555 |
| 6666 |
| 7777 |
| 8888 |
| 9999 |

TABLE 2

| |
|---|
| 2345 |
| 3456 |
| 4567 |
| 5678 |
| 6789 |
| 2345 |

TABLE 2-continued

| |
|---|
| 3456 |
| 4567 |
| 5678 |

At Step 435, non-numeric character 104, if any, from primary field 110 is extracted from the mailing address. Systems and methods for extracting non-numeric character 104 from a mailing address are well-known to those of ordinary skill in the art. Non-numeric character 104 is converted to a first number. In one embodiment, non-numeric character 104 is assigned a value as follows: space=0; A=1; B=1; . . . ; Z=26.

At step 440, secondary number 112, if any, from secondary field 120 is extracted from the mailing address. Systems and methods for extracting secondary number 112 from the mailing address are well known to those of ordinary skill in the art.

At step 445, non-numeric character 114, if any, from secondary field 120 is extracted from the mailing address. Systems and methods for extracting non-numeric character 114 from a mailing address are well known to those of ordinary skill in the art. Non-numeric character 114 is converted to a second number. In one embodiment, non-numeric character 114 is assigned a value as follows: space=0; A=1; B=2; . . . ; Z=26.

At step 450, the standard postal code, the primary number, the secondary number, the first number, and the second number are concatenated to create a resulting standardized mailing address. The components may be concatenated in any order. For example, the components may be concatenated together in the following order: primary number, first number, secondary number, second number, and standard postal code. Further, to achieve a desired length, concatenation may comprise zero padding the standardized mailing address. The resulting standardized mailing address may be a numeric number in integer form corresponding to the concatenated components. Systems and methods for concatenating the components together to form a numeric number are well known to those of ordinary skill in the art.

Figure 5:
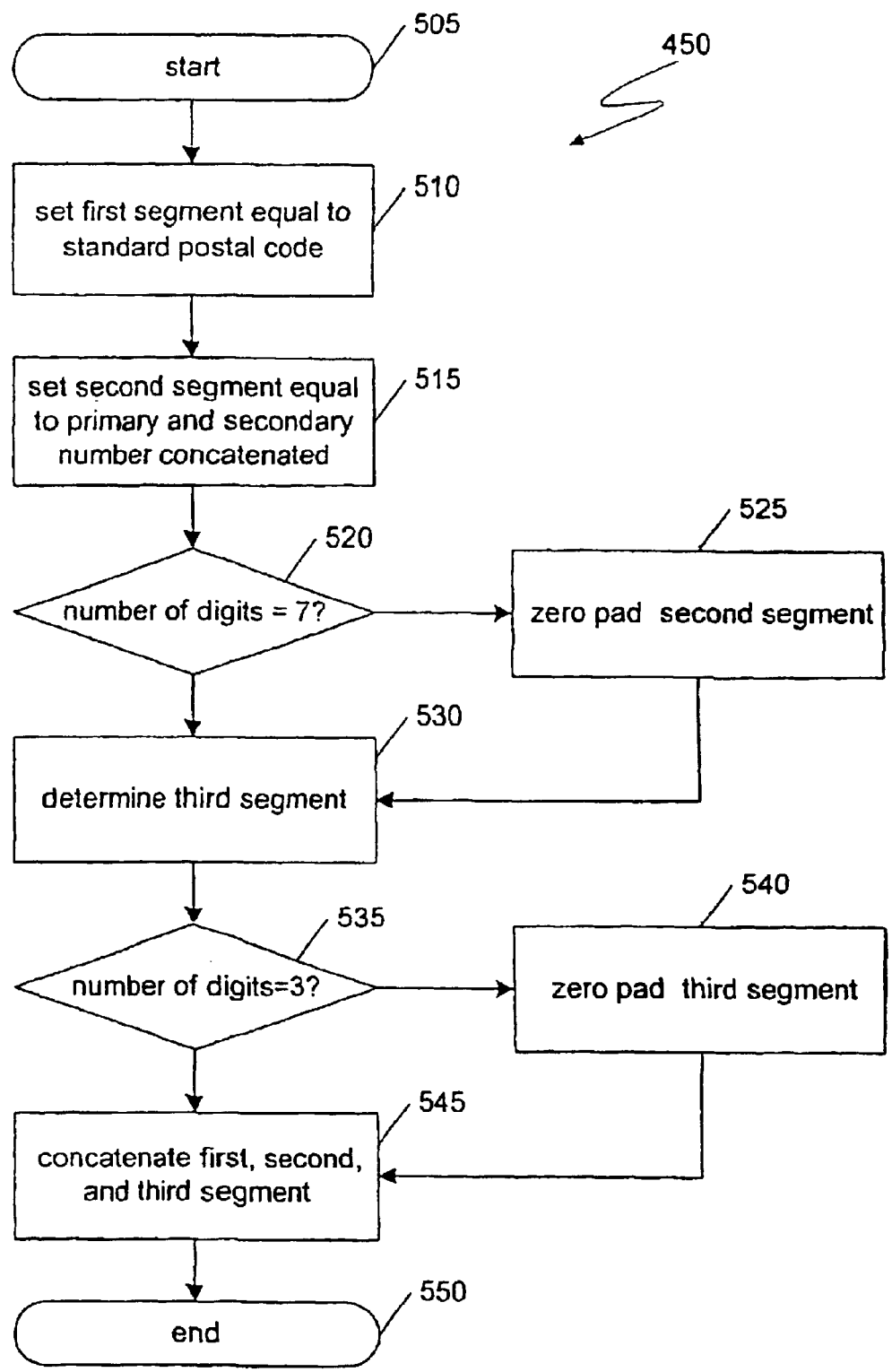
FIG. 5 illustrates a method for concatenating components of a mailing address consist with the present invention

FIG. 5 illustrates a method for concatenating the components consistent with the present invention. At step 510, a first segment is set equal to the standard postal code (such as a ZIP+4™ code) determined at step 415. At step 515, a second segment is set equal to primary number 102 and secondary number 112 concatenated. At step 520, it is determined whether the second segment is seven digits long. If the second segment is not seven digits long, then the second segment is zero padded sufficient to make the second segment seven digits long. In one embodiment, the second segment is padded with leading zeros sufficient to make the second segment seven digits long. In alternate embodiments, the second segment is not zero padded or is zero padded sufficient to make the second segment any desired length.

At step 530, a third segment is determined. If the mailing address includes a non-numeric character 104 in primary field 110 and a non-numeric character 114 in secondary field 120, then the third segment may be set equal to the first number multiplied by twenty-seven plus the second number. If the mailing address includes only a non-numeric character 104 in the primary field 110, then the third segment may be set equal to the first number. If the mailing address includes only a non-numeric character 114 in secondary field 120, then the third segment may be set equal to the second number.

At step 535, it is determined whether the third segment is three digits long. If the third segment is not three digits long, then the third segment is zero padded sufficient to make the third segment three digits long. In one embodiment, the third segment is padded with leading zeros sufficient to make the third segment three digits long. In alternate embodiments, the second segment is not zero padded or is zero padded sufficient to make the second segment any desired length.

At step 545, the standardized mailing address in determined by concatenating the first, second, and third segment. These segments may be concatenated in any order. In one embodiment, the first segment, second, and third segment are concatenated from left to right in that order.

Using the method illustrated in FIG. 5, the standardized mailing address for mailing address 210 (FIG. 2) will now be determined. At step 510, the first segment is set equal to 381881013. At step 515, the second segment is set equal to 12343. Because the second segment is not seven digits long (i.e., "NO" at 520), the second segment is padding with leading zeros sufficient to make the second segment seven digits long. Accordingly, at step 525, the second segment is set equal to 0012343.

At step 530, the third segment is not set because mailing address 210 does not include a non-numeric character 104 in the primary field 110 or a non-numeric character 114 in the secondary field 120. Because the third segment is not three digits long (i.e., "NO" at 535), the third segment is padded with zeros sufficient to make the third segment three digits long. Accordingly, at step 540, the third segment is set equal to 000.

At step 545, standardized mailing address 240 is determined by concatenating the first, second, and third segment. This method can be repeated for mailing addresses 220 and 230, thus yielding the same standardized mailing address 240.

In an alternate embodiment, the secondary descriptor 140 may be extracted from the mailing address and the first character of the secondary descriptor 140 may be converted to a second number in lieu of steps 440 and 445.

The systems and methods consistent with the present invention may be used to standardize the mailing addresses in a mailing list. Accordingly, multiple instances of a single mailing address may be represented by a single standardized address. The systems and methods consistent with the present invention may be used in any system where standardizing a mailing address may be needed. The methods consistent with the present invention may be implemented manually, in software, firmware, hardware, or any combination thereof.

Further, in one embodiment, a primary field 110 of a mailing address may have more than one non-numeric character 104 (e.g., "AB"). If there exists two non-numeric characters in the primary field, then the two non-numeric characters may be converted to a number by first assigning each non-numeric character a value as follows: space=0; A=1; B=2; . . . ; Z=26. The first value is then multiplied by twenty seven and added to the second value. For example "AA" may be converted to 28 and "ZZ" may be converted to 728. Similarly, a secondary field 110 of a mailing address may have more than one non-numeric character 114. If there exists two non-numeric characters in the secondary field, then the two non-numeric characters may be converted to a number by first assigning each non-numeric character a value as follows: space=0; A=1; B=2; . . . ; Z=26. The first value is then multiplied by twenty seven and added to the second value.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for standardizing a mailing address, comprising:
   extracting a postal code from the mailing address;
   extracting a primary number from a primary field of the mailing address;
   padding the primary number to obtain a predetermined length if the primary number is less than the predetermined length;
   extracting a secondary number from a secondary field of the mailing address; and
   concatenating the postal code, the primary number, and the secondary number.

2. The method according to claim 1, further comprising:
   determining a standard postal code for the mailing address; and
   concatenating the standard postal code, the primary number, and the secondary number.

3. The method according to claim 1, wherein the postal code is all numeric.

4. The method according to claim 3, wherein the postal code comprises an initial postal code.

5. The method according to claim 4, wherein an expanded postal code is included with the initial postal code.

6. The method according to claim 3, wherein the postal code comprises an initial postal code and an expanded postal code.

7. The method according to claim 2, further comprising:
   extracting at least one non-numeric character from the primary field of the mailing address; and
   concatenating the standard postal code, the primary number, the secondary number, and the at least one non-numeric character from the primary field.

8. The method according to claim 2, further comprising:
   extracting at least one non-numeric character from the secondary field of the mailing address; and
   concatenating the standard postal code, the primary number, the secondary number, and the at least one non-numeric character from the secondary field.

9. The method according to claim 2, further comprising
   extracting at least one non-numeric character from the primary field of the mailing address;
   extracting at least one non-numeric character from the secondary field of the mailing address; and
   concatenating the standard postal code, the primary number, the secondary number, the at least one non-numeric character from the primary field, and the at least one non-numeric character from the secondary field.

10. The method according to claim 2; further comprising:
    extracting at least one non-numeric character from the primary field of the mailing address;
    converting the at least one non-numeric character from the primary field to a first number; and
    concatenating the standard postal code, the primary number, the secondary number, and the first number.

11. The method according to claim 2, further comprising:
    extracting at least one non-numeric character from the secondary field of the mailing address;

converting the at least one non-numeric character from the secondary field to a second number; and concatenating the standard postal code, the primary number, the secondary number, and the second number.

12. The method according to claim 2, further comprising:

extracting at least one non-numeric character from the primary field of the mailing address;

extracting at least one non-numeric character from the secondary field of the mailing address;

converting the at least one non-numeric character from the primary field to a first number;

converting the at least one non-numeric character from the secondary field to a second number; and concatenating the standard postal code, the primary number, the secondary number, the first number, and the second number.

13. The method according to claim 2, further comprising:

determining whether the primary number corresponds to a first predetermined number;

setting the primary number equal to a second predetermined number based on the determination; and concatenating the standard postal code, the second predetermined number, and the secondary number.

14. A computer readable medium containing instructions for controlling a computer system to perform a method, the method comprising:

extracting a postal code from the mailing address;

extracting a primary number from a primary field of the mailing address;

padding the primary number to obtain a predetermined length if the primary number is less than the predetermined length;

extracting a secondary number from a secondary field of the mailing address; and concatenating the postal code, the primary number, and the secondary number.

15. The computer readable medium according to claim 14, the method further comprising:

determining a standard-postal code for the mailing address; and concatenating the standard postal code, the primary number, and the secondary number.

16. The computer readable medium according to claim 14, wherein the postal code is all numeric.

17. The computer readable medium according to claim 16, wherein the postal code comprises an initial postal code.

18. The computer readable medium according to claim 17, wherein an expanded postal code is included with the initial postal code.

19. The computer readable medium according to claim 16, wherein the postal code comprises an initial postal code and an expanded postal code.

20. The computer readable medium according to claim 15, the method further comprising:

extracting at least one non-numeric character from the primary field of the mailing address; and concatenating the standard postal code, the primary number, the secondary number, and the at least one non-numeric character from the primary field.

21. The computer readable medium according to claim 15, the method further comprising:

extracting at least one non-numeric character from the secondary field of the mailing address; and concatenating the standard postal code, the primary number, the secondary number, and the at least one non-numeric character from the secondary field.

22. The computer readable medium according to claim 15, the method further comprising:

extracting at least one non-numeric character from the primary field of the mailing address;

extracting at least one non-numeric character from the secondary field of the mailing address; and concatenating the standard postal code, the primary number, the secondary number, the at least one non-numeric character from the primary field, and the at least one non-numeric character from the secondary field.

23. The computer readable medium according to claim 15, the method further comprising:

extracting at least one non-numeric character from the primary field of the mailing address;

converting the at least one non-numeric character from the primary field to a first number; and concatenating the standard postal code, the primary number, the secondary number, and the first number.

24. The computer readable medium according to claim 15, the method further comprising:

extracting at least one non-numeric character from the secondary field of the mailing address;

converting the at least one non-numeric character from the secondary field to a second number; and concatenating the standard postal code, the primary number, the secondary number, and the second number.

25. The computer readable medium according to claim 15, the method further comprising:

extracting at least one non-numeric character from the primary field of the mailing address;

extracting at least one non-numeric character from the secondary field of the mailing address;

converting the at least one non-numeric character from the primary field to a first number;

converting the at least one non-numeric character from the secondary field to a second number; and concatenating the standard postal code, the primary number, the secondary number, the first number, and the second number.

26. The computer readable medium according to claim 15, the method further comprising:

determining whether the primary number corresponds to a first predetermined number; and setting the primary number equal to a second predetermined number based on the determination.

27. A system for standardizing a mailing address, comprising:

means for extracting a postal code from the mailing address;

means for extracting a primary number from a primary field of the mailing address;

means for padding the primary number to obtain a predetermined length if the primary number is less than the predetermined length;

means for extracting a secondary number from a secondary field of the mailing address; and means for concatenating the postal code, the primary number, and the secondary number.

28. The system according to claim 27, further comprising:

means for determining a standard postal code for the mailing address; and means for concatenating the standard postal code, the primary number, and the secondary number.

29. The system according to claim 27, wherein the postal code is all numeric.

30. The system according to claim 29, wherein the postal code comprises an initial postal code.

31. The system according to claim 30, wherein an expanded postal code is included with the initial postal code.

32. The system according to claim 29, wherein the postal code comprises an initial postal code plus an expanded postal code.

33. The system according to claim 28, further comprising:
means for extracting at least one non-numeric character from the primary field of the mailing address; and
means for concatenating the standard postal code, the primary number, the secondary number, and the at least one non-numeric character from the primary field.

34. The system according to claim 28, further comprising:
means for extracting at least one non-numeric character from the secondary field of the mailing address; and
means for concatenating the standard postal code, the primary number, the secondary number, and the at least one non-numeric character from the secondary field.

35. The system according to claim 28, further comprising
means for extracting at least one non-numeric character from the primary field of the mailing address;
means for extracting at least one non-numeric character from the secondary field of the mailing address; and
means for concatenating the standard postal code, the primary number, the secondary number, the at least one non-numeric character from the primary field, and the at least one non-numeric character from the secondary field.

36. The system according to claim 28, further comprising:
means for extracting at least one non-numeric character from the primary field of the mailing address;
means for converting the at least one non-numeric character from the primary field to a first number; and
means for concatenating the standard postal code, the primary number, the secondary number, and the first number.

37. The system according to claim 28, further comprising:
means for extracting at least one non-numeric character from the secondary field of the mailing address;
means for converting the at least one non-numeric character from the secondary field to a second number; and
means for concatenating the standard postal code, the primary number, the secondary number, and the second number.

38. The system according to claim 28, further comprising:
means for extracting at least one non-numeric character from the primary field of the mailing address;
means for extracting at least one non-numeric character from the secondary field of the mailing address;
means for converting the at least one non-numeric character from the primary field to a first number;
means for converting the at least one non-numeric character from the secondary field to a second number; and
means for concatenating the standard postal code, the primary number, the secondary number, the first number, and the second number.

39. The system according to claim 28, further comprising:
means for determining whether the primary number corresponds to a first predetermined number;
means for setting the primary number equal to a second predetermined number based on the determination; and
means for concatenating the standard postal code, the second predetermined number, and the secondary number.

40. A system for standardizing a mailing address, comprising:
a server for:
extracting a postal code from the mailing address,
extracting a primary number from a primary field of the mailing address,
padding the primary number to obtain a predetermined length if the primary number is less than the predetermined length,
extracting a secondary number from a secondary field of the mailing address, and
concatenating the postal code, the primary number, and the secondary number;
a workstation for inputting and storing at least one mailing address; and means for transmitting the at least on mailing address to the server.

* * * * *

UNITED STATES PATENT AND TRADEMARK OFFICE
CERTIFICATE OF CORRECTION

PATENT NO.    : 6,886,747 B2
DATED         : May 3, 2005
INVENTOR(S)   : Robert F. Snapp It is certified that error appears in the above-identified patent and that said Letters Patent is hereby corrected as shown below:

<u>Title page,</u>
Item [75], Inventor, "Robert F Snapp" should read -- Robert F. Snapp --.

<u>Column 6,</u>
Line 58, "claim 2; further" should read -- claim 2, further --.

<u>Column 10,</u>
Line 41, "at least on" should read -- at least one --.

Signed and Sealed this

Eleventh Day of October, 2005

JON W. DUDAS
*Director of the United States Patent and Trademark Office*